Feb. 28, 1967   J. E. HEIDER   3,305,892
METHOD AND APPARATUS FOR MAKING A BLOWN PLASTIC ARTICLE
Filed Jan. 2, 1964   2 Sheets-Sheet 1

INVENTOR.
JAMES E. HEIDER
ATTORNEYS

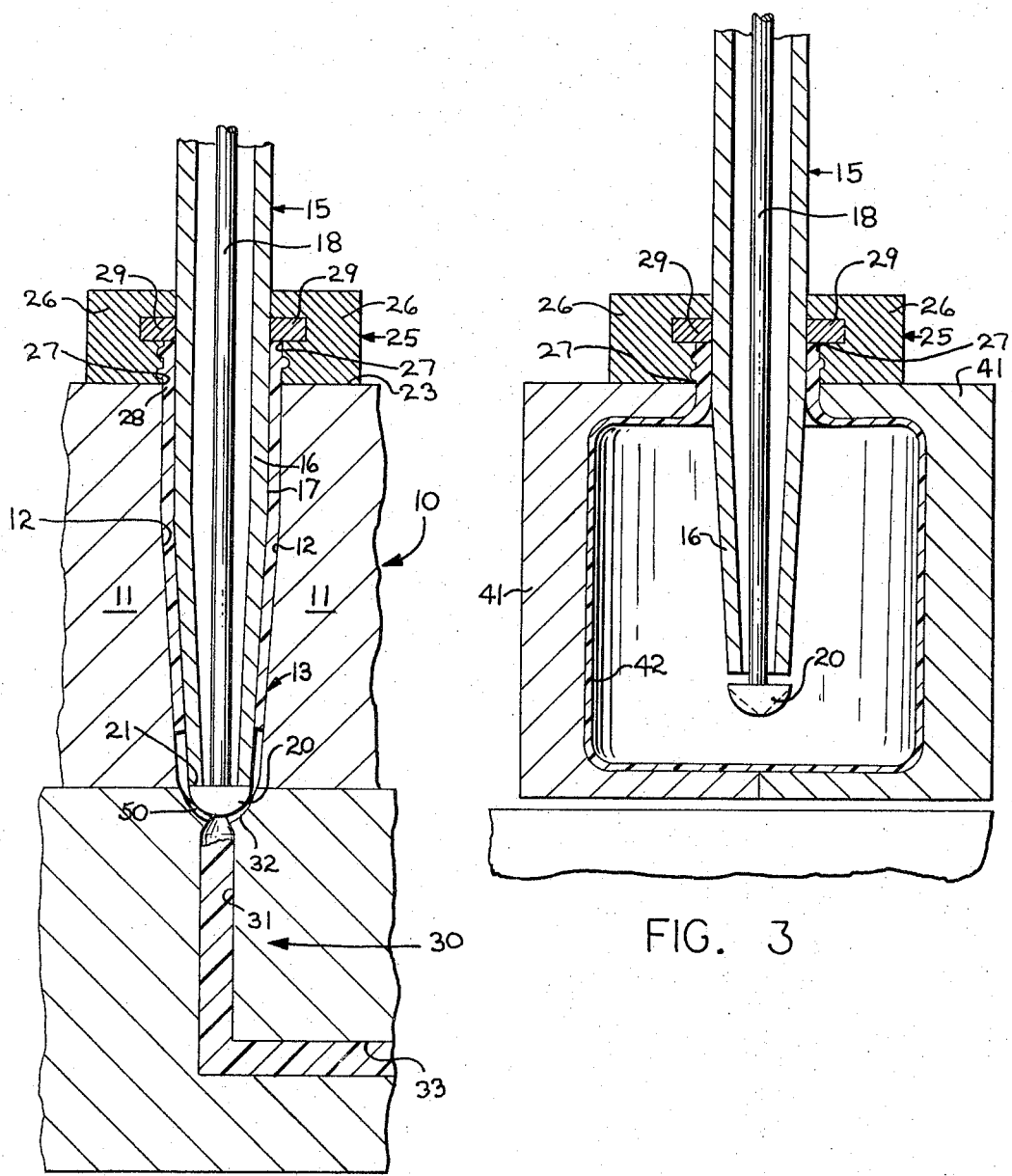

United States Patent Office 3,305,892
Patented Feb. 28, 1967

3,305,892
METHOD AND APPARATUS FOR MAKING
A BLOWN PLASTIC ARTICLE
James E. Heider, Toledo, Ohio, assignor to Owens-Illinois
Inc., a corporation of Ohio
Filed Jan. 2, 1964, Ser. No. 335,204
3 Claims. (Cl. 18—5)

The present invention relates to an apparatus for making a blown plastic article. More particularly, the present invention is concerned with an apparatus for and a method of forming a blowable shape or parison from which a plastic article may be formed.

In the manufacture of blown articles such as containers, various methods of parison formation have been proposed. In the co-pending application of Thomas R. Santelli, Serial No. 146,686 filed October 17, 1961, and assigned to the assignee of the present invention, there is disclosed a method of and apparatus for forming a parison by injection molding plasticized material in an open-ended parison recess and about a parison sleeve or "pin" projecting axially into the recess and terminating in spaced relation to one end thereof. The parison forming process results in a generally cylindrical parison having a closed end, thus forming a bubble which can be inflated after enclosure in a pair of blow molds to form the final article.

In the manufacture of elongated articles requiring an equivalent elongated parison, some difficulty has been encountered in a lateral displacement of a centrally located parison pin, which in order to form a closed bottom parison must project into the parison mold space in cantilever fashion. In the co-pending application of Charles E. Plymale, Serial No. 288,332 filed June 17, 1963 and assigned to the Assignee of the present invention, there is disclosed a method and apparatus wherein a parison pin stabilizing element is provided for accurately retaining the parison pin in its axial location in the parison mold recess while still accommodating the formation of the parison bottom wall.

In the aforementioned Plymale application, a multipurpose stabilizer or support element is provided; this support element serving, during injection molding of the parison sidewall portions, to stabilize the parison pin and to align the pin axially in the parison mold and being movable to a second position out of contact with the parison pin during the formation of the parison bottom and finally serving as a valve to shut off the flow of plasticized material to the parison chamber. In order to accomplish these purposes, provisions must be made for movement of the parison pin, as well as movement of the parison pin stabilizer element.

In order to accomplish the aforementioned purposes, it is necessary to provide very close coordination and control of the movable parison pin and the movable parison pin stabilizer element. It is an important object of the present invention to provide an improved method of making a blown plastic article wherein a blowable parison is formed about a parison pin stabilized in accurate axial alignment during formation of the parison without the necessity of utilizing a movable parison pin stabilizer element.

Another important object of this invention is the provision of a parison forming apparatus wherein a parison pin is accurately retained in position during parison formation.

It is yet another object of this invention to provide an apparatus for injection molding a parison and including means serving to stabilize the parison pin during formation of the major portion of the parison and permitting movement of the parison pin toward a different position to accommodate the formation of the parison bottom.

Other objects of the invention will appear in the following description and appended claims, reference being had to the accompanying drawings forming a part of the specification wherein like reference characters designate corresponding parts in the several views.

On the drawings:

FIGURE 3 is a view illustrating the blowing of the parison to its final article configuration; and FIGURE 4 is a view similar to FIGURE 1 illustrating a modification of the apparatus shown in FIGURE 1.

Before explaining the present invention in detail, it is to be understood that the invention is not limited in its application to the details of construction and arrangement of parts illustrated in the accompanying drawings since the invention is capable of other embodiments and of being practiced or carried out in various ways. Also it is understood that the phraseology or terminology applied herein is for purposes of description and not of limitation.

Figure 1:
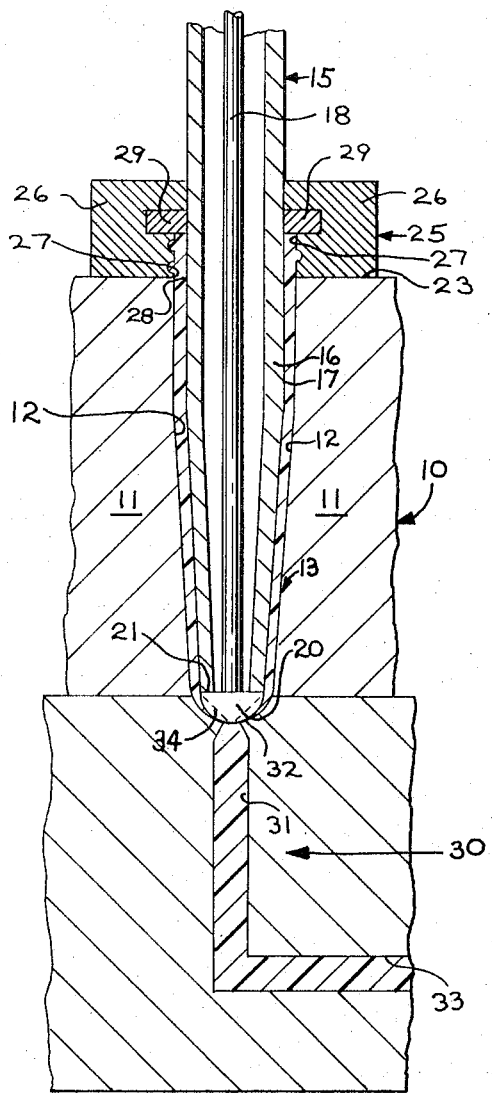
FIGURE 1 is a vertical sectional view, with parts shown in elevation, illustrating an apparatus of the present invention for carrying out the method of the present invention, the apparatus being illustrated with the parison pin being stabilized during the formation of a major portion of the parison.

As shown on the drawings:

In FIGURE 1, reference numeral 10 refers generally to an apparatus of the present invention comprising a parison mold 11, of the type illustrated in the above-identified Santelli application, and having a central, vertically extending, generally cylindrical recess 12 defining the outer wall of the parison mold chamber indicated generally at 13. Projecting into the parison mold recess 12 is a parison pin indicated generally at 15 and comprising an outer generally cylindrical sleeve 16 having an exterior peripheral surface 17 spaced radially from the recessed surface 12 to form the inner portion of the parison chamber 13.

Projecting axially through the sleeve 16 is an actuating rod 18 bearing, at its lower end, an enlarged valve head 20 contacting the free lower angular extremity 21 of the sleeve 16. The diameter of the valve head 20 is substantially the same as the external diameter of the sleeve 16, the valve head 20 and the sleeve 16 cooperatively defining the parison pin 15. The exposed lower surface 22 of the valve head 20 is semi-spherical in shape, the function of which will be explained hereinafter.

Abutting the exposed upper surface 23 of the parison mold 11 is a neck mold structure indicated generally at 25 and comprising a pair of laterally separable neck mold blocks 26 having cooperative semi-annular recesses 27, respectively, surrounding the sleeve 16 and defining therewith interior mold recess 28, having a contour of a finished non-blown portion of the final article to be formed, such as the neck of a blown container. Each of the neck mold sections 26 carries an insert 29 defining the upper end of the complete parison mold space.

The parison mold 11 is superimposed upon a supply block indicated generally at 30 and having a cylindrical bore 31 therethrough axially aligned with the mold space 13. At the intersection of the mold space 13 and the bore 31, an outwardly and upwardly directed annular and tapered shoulder 32 is defined.

The bore 31 is adapted to receive plasticized material from a suitable source such as a plasticizer-extruder (not shown) through a lateral supply passage 33. The shoulder 32 of the supply block 30 forms an annular recess 35 in the block 30 in communication with the bore 31. The annular recess 35 is constructed to receive thereagainst the lower surface 22 of the parison pin 15. The lower surface 22 of the parison pin 15 is provided with a plurality of flow slots 34 which communicate with the bore 31 and the parison mold space 13 when the parison pin 15 is in its position as shown in FIGURE 1.

Figure 2:
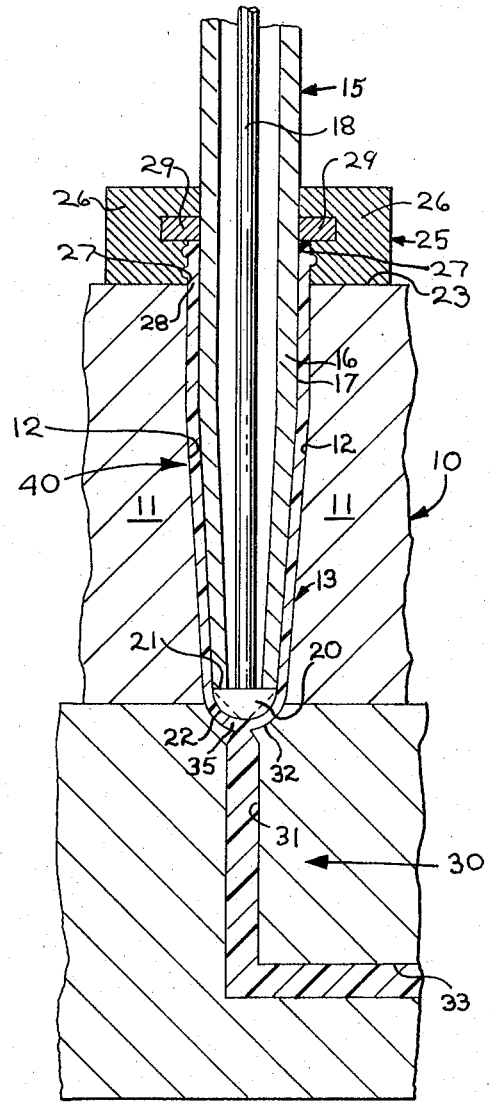
FIGURE 2 is a view similar to FIGURE 1 illustrating the formation of the complete parison.

The operation of the apparatus and the performance of the present invention will be readily appreciated by a comparison of FIGURES 1, 2 and 3.

As shown best in FIGURE 1, the apparatus is initially positioned with the parison pin assembly 15 inserted into the recess 12 to define the annular mold space 13 and with the neck ring sections 26 assembled as illustrated to define the upper neck mold cavity 28. The parison pin assembly 15 is seated in the annular recess 35 in abutment with the annular shoulder 32 of the supply block 30.

Next, plasticized material, under pressure from the source (not shown), enters the mold space 13 through the supply passage 33 and the flow passage 31 and the slots 34 on the surface 22 of the parison pin valve 20. The material passes between the exterior periphery 17 of the parison sleeve 16 and the bore wall 12 of the parison mold 11 to completely fill the mold space 13 with plasticized material. Due to contact between the annular recess 35 and the parison pin 15, the pin 15 is stabilized in the parison mold recess against any radial displacement during flow of the material into the mold space.

After filling the mold space 13, the parison pin 15 is lifted out of the recess 35 by means (not shown) a distance substantially equal to the desired bottom wall or closed end of the parison. The parison pin 15 may be moved out of the recess by any suitable means, such as by a hydraulic piston. This establishes communication with the source of plasticized material to form the closed end of the parison as shown in FIGURE 2. After completion of the formation of the parison closed end, the plasticized material is shut off by valve means (not shown) and the completed parison 40 is stripped from the parison mold 11 by relative axial displacement, or alternatively by opening the parison mold 11 in the event that a split-type parison mold is utilized. The parison is preferably transferred, as a unit with the parison pin 15, to be enclosed in a pair of separable blow mold sections 41, having their inner surface 42 contoured to the configuration of the finished article. Next, the valve head 20 is moved relative to the sleeve 16 and blow air under pressure is introduced into the sleeve and about the head, actuating rod 18 to inflate the parison from the sleeve 16 and against the chill walls 42 of the blow mold 41. Finally, the blow molds are opened and the finished article is removed.

Referring now to FIGURE 4 wherein a modification of the apparatus of FIGURE 1 is shown, the lower surface 22 of the parison valve head 20 is semi-spherical in shape. The annular shoulder 32 of the supply block 30 is provided with a plurality of flow slots 50 which are in communication with the supply channel 31 and the parison mold space 13. Thus, when the parison pin assembly 15 is positioned in the recess 35, the flow slots are in communication with the parison mold cavity 13, thereby permitting flow of material from channel 33 through channel 31, flow slots 50 and into mold cavity 13. After completely filling the mold cavity 13, the formed parison 40 and the parison pin assembly 15 are moved upwardly as shown in FIGURE 2, thereby permitting formation of the closed end of the parison.

Thus, it would be appreciated that the present invention provides a method of and apparatus for forming a parison in an injection mold and about a parison pin, whereby the parison pin is stabilized against lateral movement during formation of the parison.

It should be understood that various modifications may be resorted to without departing from the spirit and scope of the following claims:

I claim:
1. Apparatus for making a parison of plasticized material including in combination, a parison mold enclosing a mold cavity and open at opposite ends thereof, a parison core projecting freely through one end of said parison mold and terminating at a free end adjacent the other end of said parison mold, said parison mold and said parison core defining an annular mold space therebetween, an end mold structure substantially closing said other open end of said parison mold and having an orifice communicating with said annular mold space through which plasticized material may be injected into said annular mold space, said free end of said parison core having a convex surface and said end mold structure having a concave surface at said orifice confronting said convex surface, one of said surfaces having a recessed portion for accommodating flow of plasticized material from said orifice through said recessed portion to said annular space when said convex and concave surfaces are in contact with each other, said end mold structure being supported and held stationary, said parison core being axially movable to a position wherein said convex surface thereof contacts said concave surface of said end mold structure, there being no complete mold space between said free end of said core and said end mold structure when said convex and concave surfaces are in contact and said end mold structure serving to stabilize said parison core when said surfaces are in contact, and said parison core being movable axially away from said end mold structure to a position wherein said convex and concave surfaces are spaced apart providing an end mold space communicating with said annular mold space in which a closed end for a parison may be molded.

2. The apparatus of claim 1 in which said parison core comprises a sleeve, and a plunger in said sleeve having a valve head thereon, said convex surface being a surface of said head.

3. The apparatus of claim 1 in which said recessed portion is provided in the free end of said parison core.

References Cited by the Examiner

UNITED STATES PATENTS

| | | | |
|---|---|---|---|
| 2,262,612 | 11/1941 | Kopitke | 264—97 |
| 2,301,338 | 11/1942 | Smith. | |
| 2,453,739 | 11/1948 | Bates | 264—328 |
| 2,822,578 | 2/1958 | Lobel | 264—328 |
| 2,825,093 | 3/1958 | High. | |

FOREIGN PATENTS 962,726  12/1949  France.

ROBERT F. WHITE, Primary Examiner.

R. B. MOFFITT, Assistant Examiner.